(12) United States Patent
Bamford

(10) Patent No.: US 9,336,325 B2
(45) Date of Patent: May 10, 2016

(54) AUTOMATIC DOWNLOAD OF CONTACT-RELATED WEB DATA FEEDS

(75) Inventor: Drew Bamford, Tao-Yuan (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 1072 days.

(21) Appl. No.: 12/098,450

(22) Filed: Apr. 6, 2008

(65) Prior Publication Data
US 2008/0276164 A1 Nov. 6, 2008

Related U.S. Application Data

(60) Provisional application No. 60/915,436, filed on May 2, 2007.

(51) Int. Cl.
*G06F 17/00* (2006.01)
*G06F 17/30* (2006.01)
(Continued)

(52) U.S. Cl.
CPC .......... *G06F 17/30905* (2013.01); *G06F 3/048* (2013.01); *G06F 3/0481* (2013.01); *G06F 17/278* (2013.01); *G06F 17/3089* (2013.01);
(Continued)

(58) Field of Classification Search
CPC ............ G06F 17/278; G06F 17/30165; G06F 17/30171; G06F 3/0481; G06F 3/048; G06F 17/30905; G06F 17/30174; G06F 17/3089; G06F 17/30897; G06F 17/30864; H04L 67/26; G06Q 10/10; G06Q 30/02
USPC ......... 715/273, 730, 719, 762–764, 777, 783, 715/739, 234; 709/200, 203, 223; 707/10
See application file for complete search history.

(56) References Cited

U.S. PATENT DOCUMENTS 7,689,682 B1 * 3/2010 Eldering et al. ............... 709/223
7,752,553 B2 * 7/2010 Pennington et al. .......... 715/751
(Continued)

FOREIGN PATENT DOCUMENTS

CN 1359069 A 7/2002
CN 1549142 A 11/2004
(Continued)

OTHER PUBLICATIONS

Office action mailed on Apr. 26, 2012 for the Taiwan application No. 097115921, filing date Apr. 30, 2008, p. 1-8.
(Continued)

*Primary Examiner* — Quoc A Tran
(74) *Attorney, Agent, or Firm* — Winston Hsu; Scott Margo

(57) ABSTRACT

A method for processing data feeds within a entity management application of a mobile device includes configuring a data feed for an entity in the entity management application of the mobile device, retrieving contents of the data feed for the entity, formatting the contents of the data feed to thereby generate formatted contents for displaying on the mobile device, and displaying the formatted contents within the entity management application. A related mobile device includes a processor and a display, where the processor is for configuring a data feed for an entity in the entity management application of the mobile device, for retrieving contents of the data feed for the entity, and for formatting the contents of the data feed to thereby generate formatted contents for displaying on the mobile device, and the display is for displaying the formatted contents within the entity management application.

18 Claims, 7 Drawing Sheets

(51) Int. Cl.
*G06F 17/27* (2006.01)
*G06Q 30/02* (2012.01)
*H04L 29/08* (2006.01)
*G06F 3/0481* (2013.01)
*G06F 3/048* (2013.01)
*G06Q 10/10* (2012.01)

(52) U.S. Cl.
CPC ..... *G06F 17/30165* (2013.01); *G06F 17/30171* (2013.01); *G06F 17/30174* (2013.01); *G06F 17/30864* (2013.01); *G06F 17/30867* (2013.01); *G06Q 10/10* (2013.01); *G06Q 30/02* (2013.01); *H04L 67/26* (2013.01)

(56) References Cited

U.S. PATENT DOCUMENTS

| | | | |
|---|---|---|---|
| 7,966,647 B1* | 6/2011 | Igoe et al. | 726/2 |
| 2005/0198299 A1* | 9/2005 | Beck et al. | 709/226 |
| 2006/0073812 A1* | 4/2006 | Punaganti Venkata et al. | 455/412.1 |
| 2006/0173985 A1* | 8/2006 | Moore | 709/223 |
| 2006/0190616 A1* | 8/2006 | Mayerhofer et al. | 709/231 |
| 2007/0061301 A1 | 3/2007 | Ramer | |
| 2007/0282962 A1* | 12/2007 | Kim et al. | 709/207 |
| 2008/0126476 A1* | 5/2008 | Nicholas et al. | 709/203 |
| 2008/0163090 A1* | 7/2008 | Cortright | 715/771 |
| 2009/0106113 A1* | 4/2009 | Arora et al. | 705/14 |

FOREIGN PATENT DOCUMENTS

| | | |
|---|---|---|
| CN | 1613105 A | 5/2005 |
| CN | 101027879 A | 8/2007 |
| WO | 2007100429 A1 | 9/2007 |

OTHER PUBLICATIONS

Office action mailed on Oct. 6, 2014 for the Taiwan application No. 097115921, filing date Apr. 30, 2008, p. 1-7.

\* cited by examiner

AUTOMATIC DOWNLOAD OF CONTACT-RELATED WEB DATA FEEDS

CROSS REFERENCE TO RELATED APPLICATIONS

This application claims priority from provisional application No. 60/915,436, filed on May 2, 2007, titled, "Automatic Download of Contact-Related Web Data Feeds", which is included herein by reference.

BACKGROUND OF THE INVENTION

1. Field of the Invention

The present invention relates to a method for processing data feeds, and more particularly, to a method and related system for processing data feeds within a contact application of a mobile device.

2. Description of the Prior Art

With the evolution of Internet technologies, real-time or near real-time interaction has become essential not only for business applications, but also for social networking and personal life.

Of the most recently popular technologies is the concept of a data feed: a mechanism for users to receive updated data from various sources, commonly used by real-time applications on the world-wide web (also called a "web data feed" or "web feed"). A web feed is a data format used for providing users with frequently updated content over the world-wide web (Internet). Content providers (or content distributors) "syndicate" or publish web feed links on their websites, which end users can subscribe to. The kinds of content delivered by a web feed are typically HTML (webpage content) or links to webpages and other kinds of digital media, including photos (still images), videos, and audio files.

In the typical scenario of using web feeds according to related art, users browse to various websites in order to view the recently-updated web feed content, logging in to each site (when needed, such as in social networking sites) to view the updated content. What's more, the majority of websites are difficult to browse on the smaller displays of today's compact mobile devices, such as those on mobile phones, portable digital assistants (PDAs), PDA phones, smart phones, and touch screen phones.

There are software tools enabling users to subscribe to and collect web feeds to be accessible in one place, known as web (data) feed aggregators. One example of a web feed aggregator is Spokeo (www.spokeo.com). Another example is one of Helios, a US-based Mobile Virtual Network Operator (MVNO). MySpace's integration with Helio has created a dedicated MySpace Mobile application (example shown in FIG. 1) installed on mobile devices subscribing to Helios' mobile service. The MySpace Mobile application 100, however, is a dedicated application designed to work only with MySpace data feeds, and receives information (for example, 115 and 125 in FIG. 1) only from other MySpace users (110 and 120, respectively). In effect, it is simply a standalone MySpace viewer. Furthermore, such a user experience implementation requires the user to specifically enter the MySpace Mobile application in order to view the single data feed.

From the above problems and examples, it is clear that while access to a data feed from a mobile device is a step in the right direction, there still exists much room for better user experiences and improvements to the access to real-time data feeds on the world-wide web.

SUMMARY OF THE INVENTION

It is therefore an objective of the present invention to solve the aforementioned problems, and to provide a method and related system for processing data feeds within a contact application of a mobile device.

These and other problems are generally solved or circumvented, and technical advantages are generally achieved, by advantageous embodiments of the present invention, which includes a method for processing data feeds within a contact application of a mobile device. The method comprises configuring a data feed for an entity in the entity management application of the mobile device, retrieving contents of the data feed for the entity, formatting the contents of the data feed to thereby generate formatted contents for displaying on the mobile device, and displaying the formatted contents within the entity management application.

In an embodiment of the present invention, the method further comprises configuring at least one data feed for the entity in the entity management application of the mobile device, retrieving contents of each data feed for the entity, formatting the contents of each data feed to thereby generate at least one formatted content for displaying on the mobile device, and displaying at least one of the formatted contents within the entity management application.

In another embodiment of the present invention, a related mobile device comprises a processor and a display, where the processor is for configuring a data feed for a entity in the entity management application of the mobile device, for retrieving contents of the data feed for the entity, and for formatting the contents of the data feed to thereby generate formatted contents for displaying on the mobile device, and the display is for displaying the formatted contents within the entity management application.

In yet another embodiment of the present invention, the mobile device comprises a processor and a display, where the processor is for configuring at least one data feed for the entity in the entity management application of the mobile device, for retrieving contents of each data feed for the entity, and for formatting the contents of each data feed to thereby generate at least one formatted content for displaying on the mobile device, and the display is for displaying at least one of the formatted contents within the entity management application.

The foregoing has outlined rather broadly the features and technical advantages of the present invention in order that the detailed description of the invention that follows may be better understood. Additional features and descriptions of the present invention will be described hereinafter which form the subject of the claims of the present invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

As mentioned in the related art, users currently must navigate through multiple websites to view the different web feeds relevant to a particular contact (e.g., a friend or other acquaintance, or an entity such as a firm, company, not necessarily a certain person). A significant disadvantage of the related art is that no existing software tightly integrates the aggregation of various web feeds (from multiple providers and content publishers) into a core operation of a mobile device. In contrast, the present invention directly integrates the various web feeds and sources into the user interface of the mobile device, allowing the user to view all configured data feeds related to a particular contact without needing to navigate multiple sites. (Please note that in this disclosure, the terms "contact" and "entity" are used interchangeably to refer to persons, organizations, or objects within the "contact application" or "entity management application" of the mobile device, and can mean substantially the same.)

Figure 1:
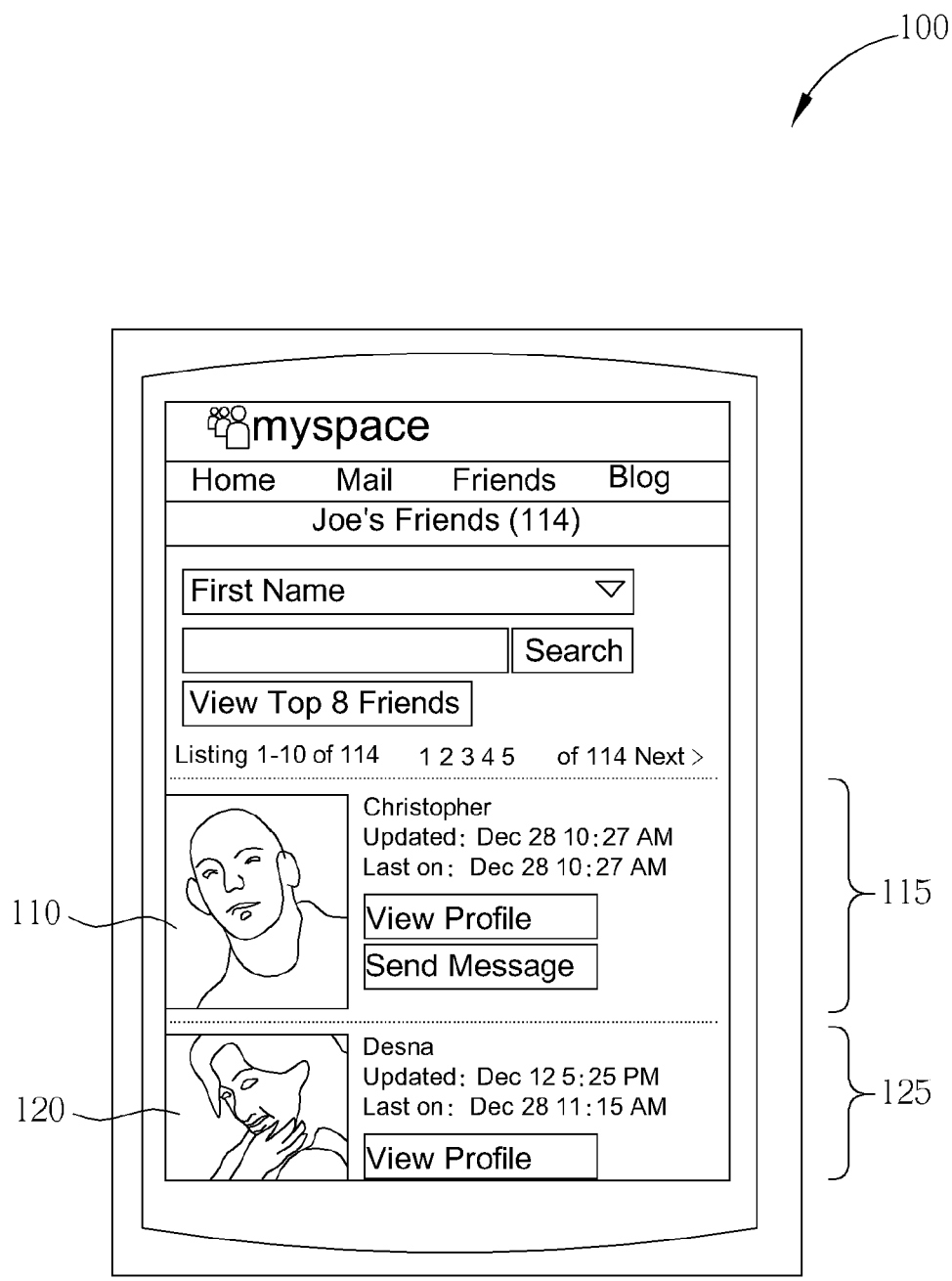
FIG. 1 is an exemplary dedicated MySpace Mobile application in collaboration with Helios according to the related art.
Figure 2:
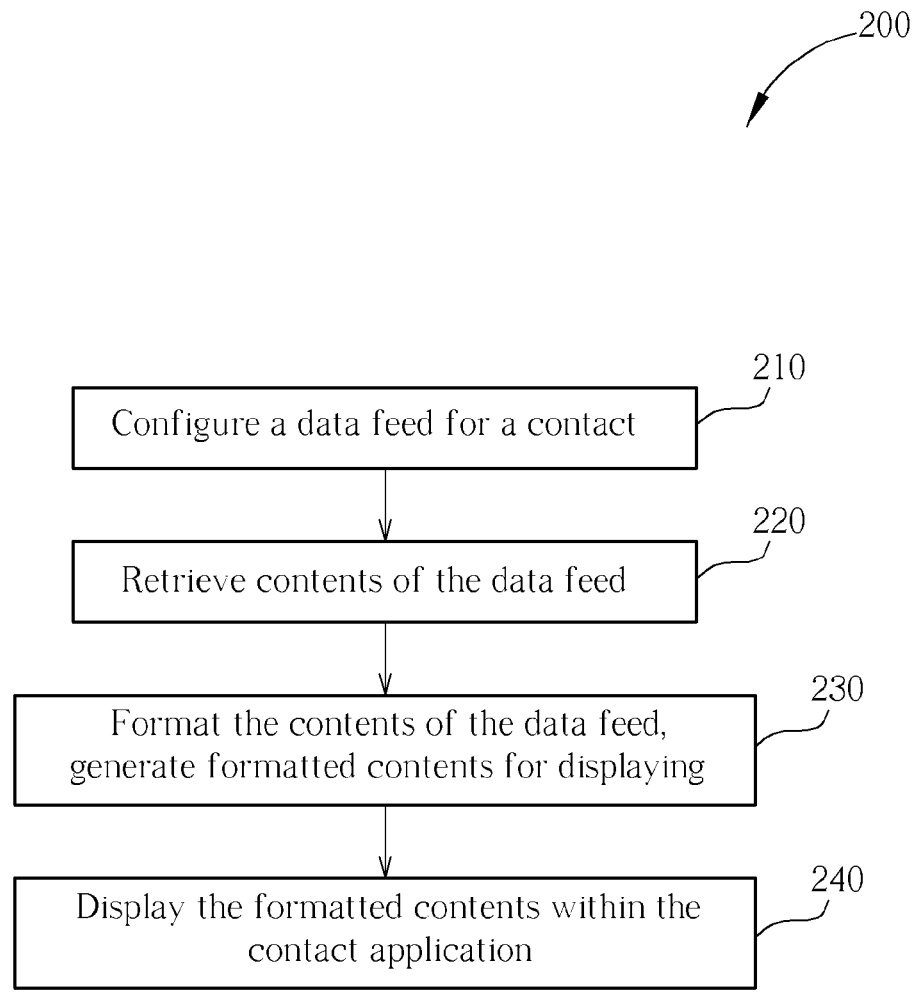
FIG. 2 is a flowchart according to a first embodiment of the present invention.

Please refer to FIG. 2, which shows a flowchart 200 for processing data feeds within a contact application of a mobile device according to a first embodiment of the present invention. Provided that substantially the same result is achieved, the steps of the process flowchart 200 need not be in the exact order shown and need not be contiguous; that is, other steps can be intermediate. This first embodiment of the method for processing data feeds within a contact application (or "entity management application" to encompass also non-person contacts) of a mobile device according to the present invention includes the following steps:

Step 210: Configure a data feed for a contact in the contact application of the mobile device.

Step 220: Retrieve contents of the data feed for the contact.

Step 230: Format the contents of the data feed to thereby generate formatted contents for displaying on the mobile device.

Step 240: Display the formatted contents within the contact application.

Step 210 signifies the beginning point of the method of the present invention, where a data feed for a contact in the contact application of the mobile device is configured. An example of this step could be where the contact is named "Tony Arnold", and the data feed is from a social music sharing service, and the configuring involves entering the data feed location for the music sharing service into a field associated with the contact (Tony) in the contact application. One should note that this step (210) may occur at any time before the other steps: the data feed can be configured immediately before, or months beforehand, and can be repeated as necessary or as desired. After the data feed as been configured, Step 220 retrieves contents of the data feed for the contact. In the current example, the contents of Tony's music sharing feed is retrieved, which may be the latest song he has been listening to, or commentary on a new song, as possible scenarios. When contents of the data feed have been successfully retrieved, the contents are then formatted to generate formatted contents for displaying on the mobile device (Step 230). Because, as mentioned, many of today's websites are not specifically designed to be optimally displayed on small mobile device screens, directly viewing the feed websites is cumbersome and can incur large data network costs (if applicable). Moreover, the web data feeds are in structured form, and specially formatting their contents allows for display in a more flexible manner for the small display. Step 240 then displays the specifically formatted contents (generated in Step 230) within the contact application of the mobile device.

After reviewing this first embodiment of the present invention, other applications and implementations will be obvious to those skilled in the art, and should be included within the scope of the present invention.

For example, in a second embodiment of the method of the present invention, a user selects the contact from a plurality of contacts in the contact application. This step may occur before the step (210) of configuring the contact's data feed, and is an optional action.

In a third embodiment of the present invention, the data feed is retrieved (Step 220) before the user selects the contact in the second embodiment, such that the web feeds are already available for formatting and displaying (steps 230 and 240). In yet another embodiment, both the retrieving and formatting steps are completed before the user selects the contact (as per the second embodiment). Other arrangements of the steps are also possible, including allowing certain of the presented steps to be executed in parallel: an example can be that the web feeds are being retrieved and/or formatted as the user is selecting a contact. It should be clear to a person skilled in the art that numerous other orders of the steps are possible, and the above examples as well as FIG. 2 are not meant to limit the scope of the present invention.

It should be noted that the data feed can be hosted in a remote location, and hence, retrieving the contents of the data feed require retrieving it over a network or from a network. In another embodiment of the present method, the feed content is automatically retrieved (either locally or over a network) without user intervention; in other words, it can be done as a background process of the mobile device without requiring the user to actively execute the action of retrieving or updating the data feed contents.

Figure 3:
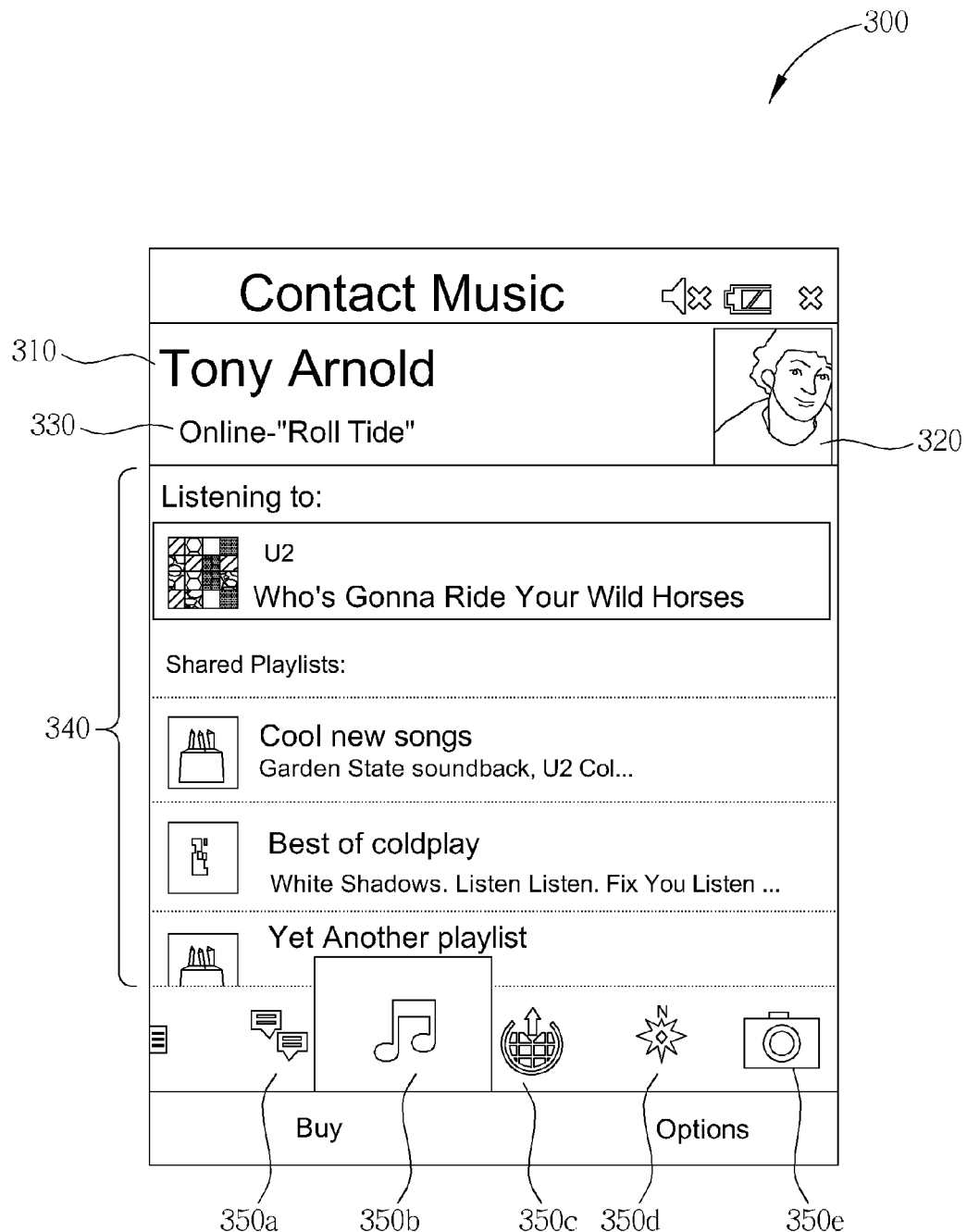
FIG. 3 is an example display of the formatted contents of a data feed of a contact (entity), displayed simultaneously with information of the contact according to the present invention.

According to a fourth embodiment of the present invention, Step 140 entails displaying the formatted contents within the contact application simultaneously with information of the contact. FIG. 3 shows an example display 300 of the formatted contents of a data feed of a contact, displayed simultaneously with information of the contact. For example, in FIG. 3, the information of the contact is the person's name ("Tony Arnold", 310), his photo 320 and online status 330, and displayed at the same time on the mobile device display are the contents 340 of the data feed. As is clear to persons skilled in the art, other variations on this embodiment and example are possible, and should be considered within the scope of the present invention. It should also be noted that the contact information being displayed simultaneously with the contents of the data feed is not meant to be a limitation of the present invention.

The number of data feeds in the present invention can also be more than one. A fifth embodiment of the present invention comprises a plurality of data feeds being configured for the contact in the contact application of the mobile device. This embodiment employs a similar flowchart as that of FIG. 2, and since the method for the plurality of data feeds is very similar to the method presented above for a single data feed for a contact in the contact application, a detailed description is omitted and instead only briefly described. The step of retrieving contents in this fifth embodiment applies to a plurality of data feeds, contents for each of the data feeds. Likewise, formatting the contents applies to the contents of each of the data feeds to thereby generate a plurality of formatted contents for displaying on the mobile device. Finally, as per Step 240, the method displays at least one of the formatted contents within the contact application. Please refer again to FIG. 3 for an example of displaying multiple data feeds 350a-350e, as well as the contents 340 of one of the plurality of data feeds for the contact in the contact application. In FIG. 3, the contents of a music feed 350b are displayed on the screen, and as before, are displayed alongside information of the contact 310-330. It should be noted that the user of the mobile device should be able to select any of the data feeds 350a-350e to display the contents of the selected data feed alongside the contact information in the contact application; in essence, all of the feeds that are relevant to a given contact (and that have been configured) are aggregated into a unified "location" within the contact application for further convenience. In the current example, the various feeds provided are a messaging feed 350a, a music feed 350b, a social network feed 350c, a location feed 350d, and an image feed 350e.

Further variations of the method of the present invention include the types of data feeds encompassed. Today, websites of different types offer data feeds, and data feeds used in the present invention can be one of a "RDF Site Summary" (RSS, commonly referred to as "Really Simple Syndication") feed, blog entries, social network updates, image or photo sharing site feeds, and video feeds (e.g., YouTube). Numerous other applications of data feeds are possible, and should also be considered within the scope of the present invention as described above. Please refer to FIG. 3 through FIG. 6 for specific examples of such data feeds; in each of FIG. 3 through FIG. 6, functionally similar components of the display are denoted with like numerals and need not be further described.

FIG. 3 shows an example of a music feed for the contact in the contact application. The contents 340 can display the music that Tony Arnold is currently listening to, shared song playlists, and myriad other music-related information. The example in FIG. 3 shows a Last.Fm music feed; other social music feeds, for example, include Pandora, MOG, iLike, and FineTune. The present invention is not limited to being one of these, nor is its scope limited to only one of these examples.

Figure 4:
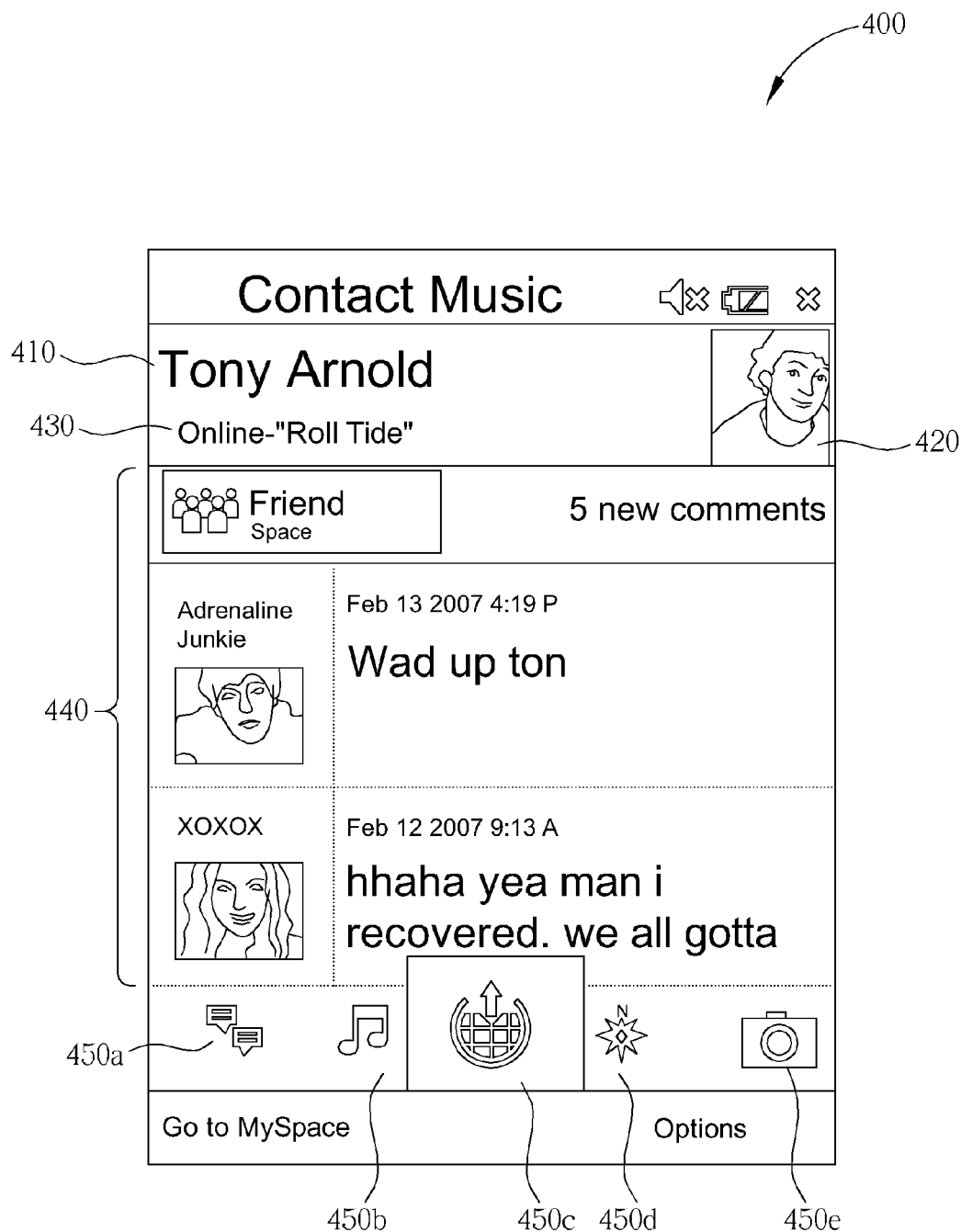
FIG. 4 is an example of a social network feed for a contact (entity) shown in the contact application of the present invention.

FIG. 4 shows an example of a social network feed for the contact in the contact application. The contents 440 can show the latest or most urgent messages left by acquaintances of the contact (Tony Arnold), or other updates related to Tony's social network on MySpace (in this example). While the example of FIG. 4 shows a MySpace data feed, other social networks include Friendster, Facebook, Hi5, for example. The present invention is not limited to being one of these, nor is its scope limited to only one of these examples.

Figure 5:
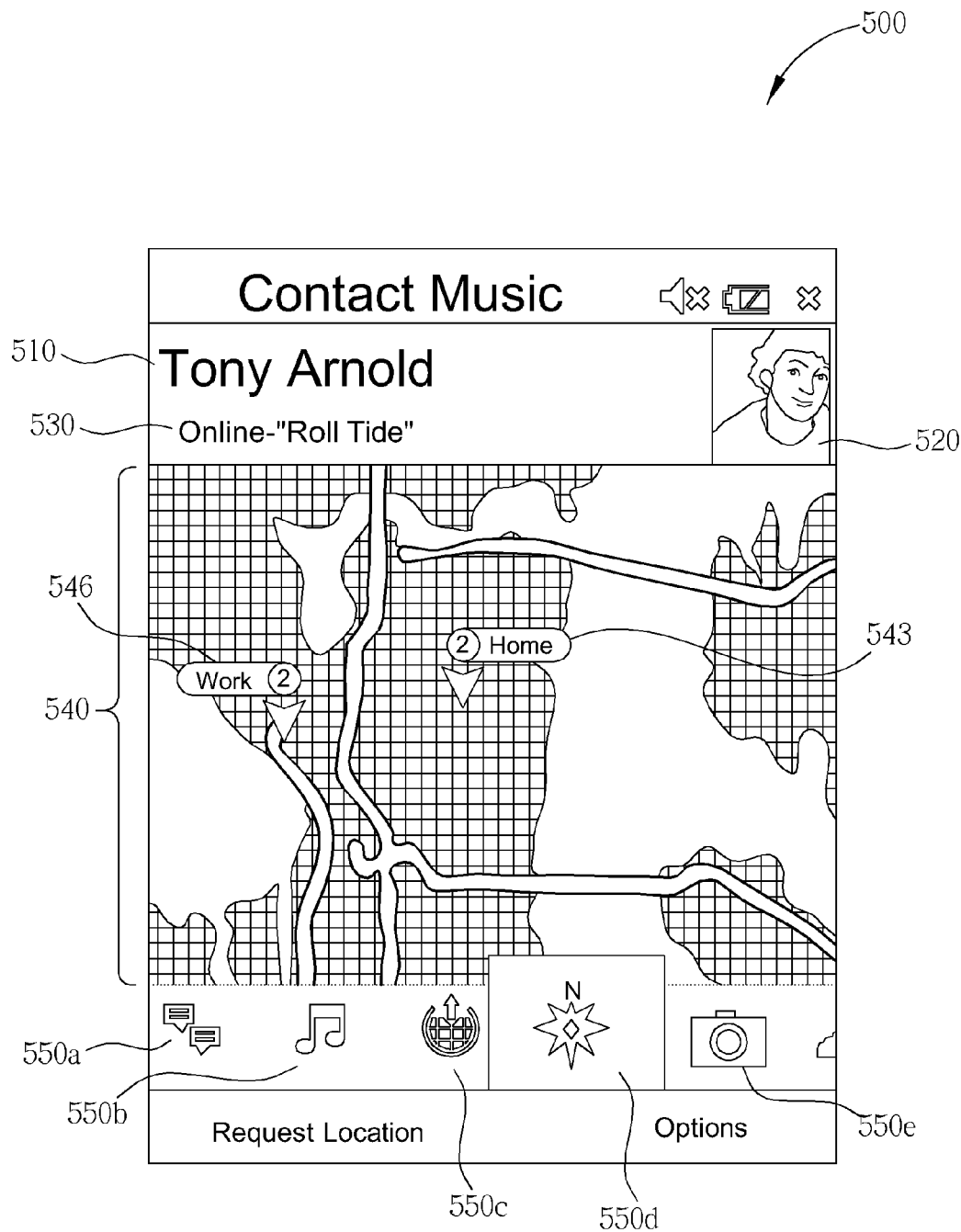
FIG. 5 is an example of a location feed for a contact (entity) shown in the contact application (entity management application) of the present invention.

FIG. 5 shows an example of a location feed for the contact in the contact application. The contents 540 can display the contact's addresses. In FIG. 5, Tony's home and work locations are displayed, 543 and 546 respectively, for example. An extension of this example includes displaying Tony's current location, if such information is available via various technologies.

Figure 6:
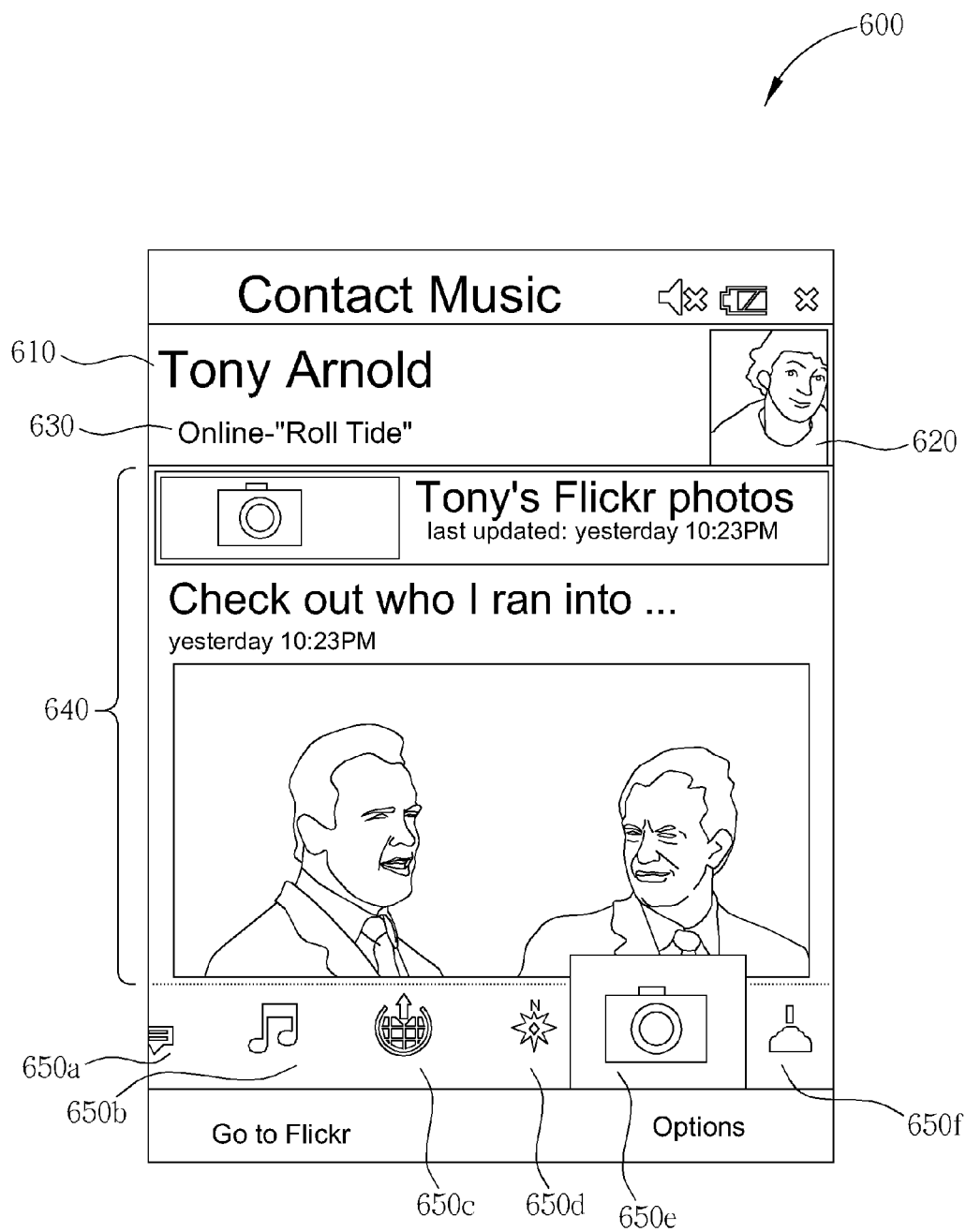
FIG. 6 is an example of an image feed for a contact (entity) shown in the contact application (entity management application) of the present invention.

FIG. 6 shows an example of an image feed for the contact in the contact application. The contents 640 can display a photo 643 shared by the contact Tony Arnold, or can display photos viewed or linked to or otherwise tagged (as favorites or interesting); other options are also possible, such as captions or comments 646. The exemplary image feed shown in FIG. 6 is image sharing site flickr, but it can be any other site as well: photobucket, Picasa, Fotki, etc. The present invention is not limited to being one of these, nor is its scope limited to only one of these examples.

Of additional note in FIG. 6 is another feed in the bottom bar: a games feed 650f. Since the applications and operation of another feed should be obvious to a reader of ordinary skill, further description has been omitted.

After reading the disclosure presented herein, other examples for different feeds (not shown) will be obvious to a reader of ordinary skill in the art, and should be considered in the scope of the present invention.

A sixth embodiment of the present invention further comprises displaying a notification of updated contents of the data feed. In this embodiment, the user of the mobile device is notified or alerted when updated content is available for viewing. Two exemplary methods of implementation are presented here, though implementing with numerous other forms will become obvious after reading the below.

A first notification method displays the feed contents notification(s) by displaying a pop-up notification message. A second notification method simply makes an indication that updated content is available; this may be by highlighting an icon, by introducing an icon, by incrementing a counter of content items updated, or a number of other methods. These notification methods may alert the user of the mobile device of updated data feed content when the relevant (related) contact is selected in the contact application, or be visible without requiring the user to have selected or opened the contact in the contact application of the mobile device. Please also note that notification of updated contents in these or other manners is optional and non-limiting to the scope of the present invention.

Figure 7:
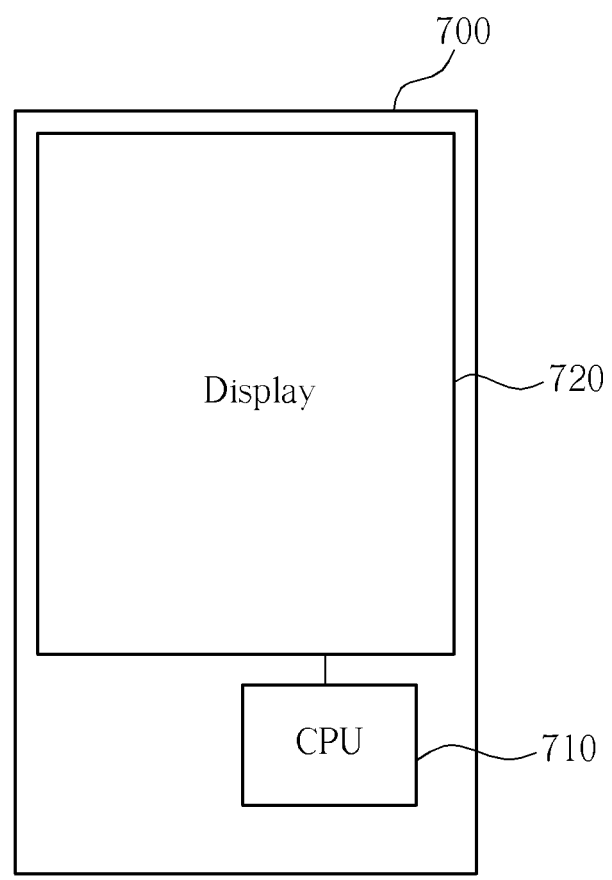
FIG. 7 is an example of a mobile phone having a processor and a display according to the present invention.

FIG. 7 shows a related system of the present invention. In FIG. 7, a mobile device 700 having a contact application for processing data feeds comprises a processor 710 and a display 720. The processor 710 configures a data feed for a contact in the contact application of the mobile device, retrieves contents of the data feed for the contact, and formats the contents of the data feed to generate formatted contents for displaying on the display 720 of the mobile device 700. The display 720 is coupled to the processor 710, and displays the formatted contents within the contact application.

The mobile device 700 can be one of a mobile phone, a portable digital assistant (PDA), a PDA phone, a smart phone, and a touch screen phone, but is also not limited being one of these. The present invention can be applied to any mobile device which includes a processor and a display with the mentioned features, and such applications and embodiments also obey the spirit of and should be considered with the scope of the present invention.

In various embodiments and options of the mobile device 700, the processor 710 can further be used for selecting the contact from a plurality of contacts in the contact application. Moreover, the display 720 can further display the formatted contents simultaneously with information of the contact within the contact application.

In another embodiment, the processor 710 is not limited to a single data feed for a contact: it can also configure a plurality of data feeds for the contact in the contact application of the mobile device. Likewise, the processor 710 then is for retrieving contents of each of the data feeds for the contact, and for formatting the contents of each of the data feeds to thereby generate a plurality of formatted contents for displaying on the display 720 of the mobile device 700. Similarly, in this embodiment, the display 720 is further for displaying at least one of the formatted contents within the contact application.

And when updated contents of the data feeds are available, the display 720 is further for displaying a notification of those updated contents; as mentioned previously, the indication may be a highlighted icon, a new icon, a pop-up notification message, or another variation of the above.

Please also note that the processor 710 in the mobile device 700 can also retrieve the contents of the data feeds from a network, as necessary, if the sources of the data feeds are in a remote location or on another network. Furthermore, the processor 710 in the mobile device 700 can automatically retrieve the contents of the data feed without user intervention.

Please note that although the display 720 is presented in this example for displaying the formatted contents within the contact application, it could be displayed within a different core application integrated in the mobile device; this is for illustration purposes only and is not intended as a limitation to the present invention.

Again, the data feeds used in the present invention can be one of an RSS feed, blog entries or comment feeds, social network updates, image or photo sharing site feeds, and video feeds. Numerous other applications of data feeds are possible, and should also be considered within the scope of the present invention as described above.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing media feeds within a contact management application of a mobile device, the method comprising:
   configuring a media feed for a contact in the contact management application of the mobile device;
   retrieving contents of the media feed for the contact;
   formatting the contents of the media feed to thereby generate formatted contents for displaying on the mobile device;
   forming an user interface for the contact management application to present the information of the contact and a visual menu bar, wherein the visual menu bar comprises a plurality of graphic icons for switching to different pages each displaying formatted contents of one of a plurality of media feeds;
   displaying the formatted contents within the contact management application simultaneously with information of the contact and the visual menu bar through the user interface;
   selecting the contact from at least one contact in the contact management application;
   selecting a media feed type by selecting one of the graphic icons; and
   automatically retrieving the contents of the media feed corresponding to the selected media feed type without user intervention;
   wherein the information of the contact comprises an online status of the contact.

2. The method of claim 1, further comprising displaying a notification of updated contents of the media feed.

3. The method of claim 2, further comprising displaying an indication for indicating that updated contents are available.

4. The method of claim 1, further comprising retrieving the contents of the media feed from a network.

5. The method of claim 1, further comprising:
   configuring at least one media feed for the contact in the entity management application of the mobile device;
   retrieving contents of each media feed for the contact;
   formatting the contents of each media feed to thereby generate at least one formatted content for displaying on the mobile device; and
   displaying at least one of the formatted contents within the contact management application.

6. The method of claim 5, wherein the formatted content is in the visual menu bar display on the mobile device.

7. The method of claim 1, wherein the mobile device is one of a mobile phone, a portable digital assistant (PDA), a PDA phone, a smart phone, and a touch screen phone.

8. The method of claim 1, wherein the media feed is one of an RDF Site Summary (RSS) feed, blog entry, social network update, image or photo feed, and video feed.

9. A mobile device having a contact management application for processing media feeds, the mobile device comprising:

a processor, for configuring a media feed for a contact in the contact management application of the mobile device, for retrieving contents of the media feed for the contact, for formatting the contents of the media feed to thereby generate formatted contents for displaying on the mobile device, for forming an user interface for the contact management application to present the information of the contact and a visual menu bar, wherein the visual menu bar comprises a plurality of graphic icons for switching to different pages each displaying formatted contents of one of a plurality of media feeds; and for automatically retrieving the contents of the media feed corresponding to a selected media feed type without user intervention; and a display, for displaying the formatted contents within the contact management application simultaneously with information of the contact and the visual menu bar;

wherein the processor is further for selecting the contact from at least one contact in the contact management application, selecting a media feed type to be the selected media feed type, and the information of the contact comprises an online status of the contact.

10. The mobile device of claim 9, wherein the display is further for displaying a notification of updated contents of the media feed.

11. The mobile device of claim 10, wherein the display is further for displaying an indication for indicating that updated contents are available.

12. The mobile device of claim 9, wherein the processor is further for retrieving the contents of the media feed from a network.

13. The mobile device of claim 9, wherein the processor is further for configuring at least one media feed for the contact in the contact management application of the mobile device, for retrieving contents of each media feed for the contact, and for formatting the contents of each media feed to thereby generate at least one formatted content for displaying on the mobile device; and the display is further for displaying at least one of the formatted contents within the contact management application.

14. The method of claim 13, wherein the formatted content is in the visual menu bar display on the mobile device.

15. The mobile device of claim 9, wherein the mobile device is one of a mobile phone, a portable digital assistant (PDA), a PDA phone, a smart phone, and a touch screen phone.

16. The mobile device of claim 9, wherein the media feed is one of an RDF Site Summary (RSS) feed, blog entry, social network update, image or photo feed, and video feed.

17. A method for navigating through information of at least one contact within a contact management application of a mobile device, the method comprising:

displaying the at least one contact;

navigating to and selecting one of the contacts for display;

selecting at least one media feed type for the contact;

retrieving contents of the at least media feed corresponding to the selected media type for the contact;

formatting the contents of each media feed to thereby generate at least one formatted content for displaying on the mobile device;

forming an user interface for the contact management application to present the information of the contact and a visual menu bar, wherein the visual menu bar comprises a plurality of graphic icons for switching to different pages each displaying formatted contents of one of a plurality of media feeds;

displaying at least one of the formatted contents simultaneously with information of the contact and the visual menu bar through the user interface;

and automatically retrieving the contents of each media feed without user intervention;

wherein the information of the contact comprises an online status of the contact.

18. A mobile device having a contact management application for navigating through at least one media feed, the mobile device comprising:

a processor, for retrieving contents of the at least one media feed corresponding to a selected media type for the contact, for formatting the contents of each media feed to thereby generate at least one formatted content for displaying on the mobile device, for forming an user interface for the contact management application to present the information of the contact and a visual menu bar, wherein the visual menu bar comprises a plurality of graphic icons for switching to different pages each displaying formatted contents of one of a plurality of media feeds; and for automatically retrieving the contents of the at least one media feed without user intervention;

an input module, for navigating to and selecting one of the contacts for display, and selecting at least one media feed type as the selected media feed type by selecting one of the graphic icons; and a display, for displaying the at least one contact and for displaying the formatted contents within the contact management application simultaneously with information of the contact and the visual menu bar;

wherein the information of the contact comprises an online status of the contact.

* * * * *